(12) United States Patent
Haycock et al.

(10) Patent No.: US 7,222,208 B1
(45) Date of Patent: May 22, 2007

(54) SIMULTANEOUS BIDIRECTIONAL PORT WITH SYNCHRONIZATION CIRCUIT TO SYNCHRONIZE THE PORT WITH ANOTHER PORT

(75) Inventors: Matthew B. Haycock, Beaverton, OR (US); Amaresh Pangal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 09/644,463

(22) Filed: Aug. 23, 2000

(51) Int. Cl.
*G06F 1/00* (2006.01)
*H03K 19/175* (2006.01)

(52) U.S. Cl. .................. 710/305; 710/106; 326/82; 326/30

(58) Field of Classification Search ........ 710/305–307, 710/308–315, 62–64, 71–74, 31–38, 56–61, 710/104–110; 326/83, 86–87, 56–58, 95, 326/98; 216/20–22
See application file for complete search history.

(56) References Cited

U.S. PATENT DOCUMENTS

| | | | | |
|---|---|---|---|---|
| 4,280,221 A | * | 7/1981 | Chun et al. ............... | 375/17 |
| 4,363,121 A | * | 12/1982 | Schlyter .................. | 370/276 |
| 4,477,896 A | * | 10/1984 | Aker ...................... | 370/24 |
| 4,535,294 A | * | 8/1985 | Ericksen et al. .......... | 327/58 |
| 4,573,168 A | | 2/1986 | Henze et al. ............. | 375/36 |
| 4,624,006 A | | 11/1986 | Rempfer et al. .......... | 377/69 |
| 5,128,962 A | * | 7/1992 | Kerslake et al. .......... | 375/220 |
| 5,134,311 A | * | 7/1992 | Biber et al. .............. | 327/108 |
| 5,164,960 A | * | 11/1992 | Winen et al. ............. | 375/224 |
| 5,179,577 A | * | 1/1993 | Ilyadis .................... | 375/76 |
| 5,216,667 A | | 6/1993 | Chu et al. ................. | 370/24 |
| 5,218,239 A | | 6/1993 | Boomer .................. | 307/443 |
| 5,253,249 A | | 10/1993 | Fitzgerald et al. ........ | 370/24 |
| 5,261,105 A | * | 11/1993 | Potter et al. ............. | 710/105 |

(Continued)

FOREIGN PATENT DOCUMENTS

EP 1 014 615 A2 * 11/1999

OTHER PUBLICATIONS

Comer, D.T., et al., "A CMOS Voltage to Current Converter for Low-Voltage Applications", *This informtion is directly from Donald T. Comer's web site:* http://www.ee.byu.edu/faculty/comerdt/publications.html, 13 p., (Feb. 11, 1997).

(Continued)

*Primary Examiner*—Paul R. Myers
*Assistant Examiner*—Raymond N Phan
(74) *Attorney, Agent, or Firm*—Schwegman, Lundberg, Woessner & Kluth, P.A.

(57) ABSTRACT

A simultaneous bidirectional port coupled to a bus includes a synchronization circuit that synchronizes the port with another simultaneous data port coupled to the same bus. The synchronization circuit includes an output driver having an imbalanced output impedance, and includes a receiver with input hysteresis. The input hysteresis of the receiver is not satisfied unless both drivers with imbalanced output impedance coupled to the bus assert an output signal. Each driver asserts a signal on the bus when initialization of the corresponding simultaneous bidirectional port is complete. When both simultaneous bidirectional ports are initialized, the hysteresis of the receivers is satisfied, and each port is notified that both have been initialized.

28 Claims, 6 Drawing Sheets

U.S. PATENT DOCUMENTS

| | | | |
|---|---|---|---|
| 5,296,756 A * | 3/1994 | Patel et al. ................... 326/21 |
| 5,325,355 A | 6/1994 | Oprescu et al. ............... 370/24 |
| 5,347,177 A * | 9/1994 | Lipp .......................... 307/443 |
| 5,457,406 A | 10/1995 | Takada et al. ................ 326/30 |
| 5,481,207 A | 1/1996 | Crafts ......................... 326/86 |
| 5,490,171 A | 2/1996 | Epley et al. ................ 375/257 |
| 5,530,377 A | 6/1996 | Walls .......................... 326/30 |
| 5,534,812 A * | 7/1996 | Cao et al. ................... 327/333 |
| 5,541,535 A | 7/1996 | Cao et al. .................... 326/83 |
| 5,578,939 A | 11/1996 | Beers et al. .................. 326/30 |
| 5,579,336 A | 11/1996 | Fitzgerald et al. .......... 375/219 |
| 5,604,450 A * | 2/1997 | Borkar et al. ................ 326/82 |
| 5,663,661 A | 9/1997 | Dillon et al. ................. 326/30 |
| 5,778,204 A | 7/1998 | Van Brunt et al. .......... 395/308 |
| 5,790,811 A * | 8/1998 | Hewitt ....................... 710/105 |
| 5,793,248 A | 8/1998 | Lee et al. ................... 327/543 |
| 5,818,884 A * | 10/1998 | Reymond .................... 375/354 |
| 5,841,827 A | 11/1998 | Chevallier ................... 377/20 |
| 5,860,134 A * | 1/1999 | Cowell ....................... 711/172 |
| 5,872,471 A * | 2/1999 | Ishibashi et al. .............. 327/98 |
| 5,903,167 A * | 5/1999 | Sanwo et al. ................ 326/86 |
| 5,948,094 A * | 9/1999 | Solomon et al. ........... 710/118 |
| 6,002,882 A * | 12/1999 | Garde ......................... 712/35 |
| 6,020,767 A * | 2/2000 | Livolsi ........................ 327/68 |
| 6,037,811 A | 3/2000 | Ozguc ........................ 327/108 |
| 6,040,714 A * | 3/2000 | Klein .......................... 326/86 |
| 6,087,847 A | 7/2000 | Mooney et al. .............. 326/30 |
| 6,087,853 A | 7/2000 | Huber et al. ................. 326/83 |
| 6,107,856 A | 8/2000 | Bitting ....................... 327/307 |
| 6,118,310 A | 9/2000 | Esch, Jr. ..................... 327/108 |
| 6,127,849 A * | 10/2000 | Walker ........................ 326/86 |
| 6,133,749 A | 10/2000 | Hansen et al. ................ 326/30 |
| 6,157,206 A | 12/2000 | Taylor et al. ................. 326/30 |
| 6,175,253 B1 * | 1/2001 | Maiyuran et al. ............. 326/86 |
| 6,188,237 B1 | 2/2001 | Suzuki et al. ................. 326/30 |
| 6,225,819 B1 * | 5/2001 | Rees et al. .................... 326/30 |
| 6,226,331 B1 | 5/2001 | Gambuzza ................... 375/258 |
| 6,256,234 B1 | 7/2001 | Keeth et al. ........... 365/189.05 |
| 6,324,596 B1 * | 11/2001 | Houg .......................... 710/19 |
| 6,329,843 B1 | 12/2001 | Hirata et al. .................. 326/82 |
| 6,366,867 B2 | 4/2002 | Sine et al. .................... 326/27 |
| 6,424,175 B1 | 7/2002 | Vangal et al. |
| 6,445,170 B1 | 9/2002 | Pangal et al. |
| 6,448,811 B1 | 9/2002 | Narendra et al. |
| 6,452,428 B1 * | 9/2002 | Mooney et al. ............. 327/108 |
| 6,507,225 B2 | 1/2003 | Martin et al. |
| 6,529,037 B1 * | 3/2003 | Haycock et al. .............. 326/30 |
| 6,549,964 B1 * | 4/2003 | Lai et al. .................... 710/107 |
| 6,597,198 B2 | 7/2003 | Haycock et al. |
| 6,708,277 B1 * | 3/2004 | Morris et al. ............... 713/300 |
| 6,791,356 B2 | 9/2004 | Haycock et al. |
| 6,803,790 B2 | 10/2004 | Haycock et al. |

OTHER PUBLICATIONS

Filanovsky, I.M., "Voltage Reference Using Mutual Compensation of Mobility and Threshold Voltage Temperature Effects", *ISCAS 2000- IEEE International Symposium on Circuits and Systems*, pp. V197-V200, (May 2000).

Haycock, M., et al., "A 2.5Gb/s Bidirectional Signaling Technology", *Hot Interconnects Symposium V*, pp. 1-8, (Aug. 1997).

Lee, S., et al., "A Temperature and Supply-Voltage Insensitive CMOS Current Reference", *IEICE Trans. Electron*, vol. E82-C (8), pp. 1562-1566, (Aug. 1999).

Horowitz, Paul, et al., "The Art of Electronics, Second Edition", *Cambridge University Press*, Comparators and Schmitt Trigger, (1989), 231-232.

* cited by examiner

SIMULTANEOUS BIDIRECTIONAL PORT WITH SYNCHRONIZATION CIRCUIT TO SYNCHRONIZE THE PORT WITH ANOTHER PORT

FIELD

The present invention relates generally to digital data ports, and more specifically to bidirectional digital data ports.

BACKGROUND OF THE INVENTION

Integrated circuits typically communicate with other integrated circuits on wires that are part of a "bus." A typical bus includes many wires, or circuit board traces, connecting multiple integrated circuits. Some buses are "unidirectional," because signals only travel in one direction on each wire of the bus. Other buses are "bidirectional," because signals travel in more than one direction on each wire of the bus. In the past, most bidirectional buses were not "simultaneously bidirectional," because multiple signals did not travel on the same wire in opposite directions at the same time; instead, the bus was shared over time, and different signals traveled in different directions at different points in time. Some newer buses are "simultaneous bidirectional" buses. Simultaneous bidirectional buses allow data to travel in two directions on a single wire at the same time.

Before reliable communications can take place on a bus, the integrated circuits need to be ready to communicate, or be "synchonized," and each circuit on the bus should have information regarding the readiness of other circuits on the bus. Some circuits may need to be initialized, while others may need to become stabilized. In some bus applications, it can take an indeterminate amount of time for circuits to become ready to reliably communicate. It can be important to not drive data onto a bus until the intended receiver is ready to receive the data, especially in simultaneous bidirectional bus applications, where data is being driven in both directions at once.

For the reasons stated above, and for other reasons stated below which will become apparent to those skilled in the art upon reading and understanding the present specification, there is a need in the art for a method and apparatus to provide a synchronization mechanism for simultaneous bidirectional data buses.

DESCRIPTION OF EMBODIMENTS

Figure 1:
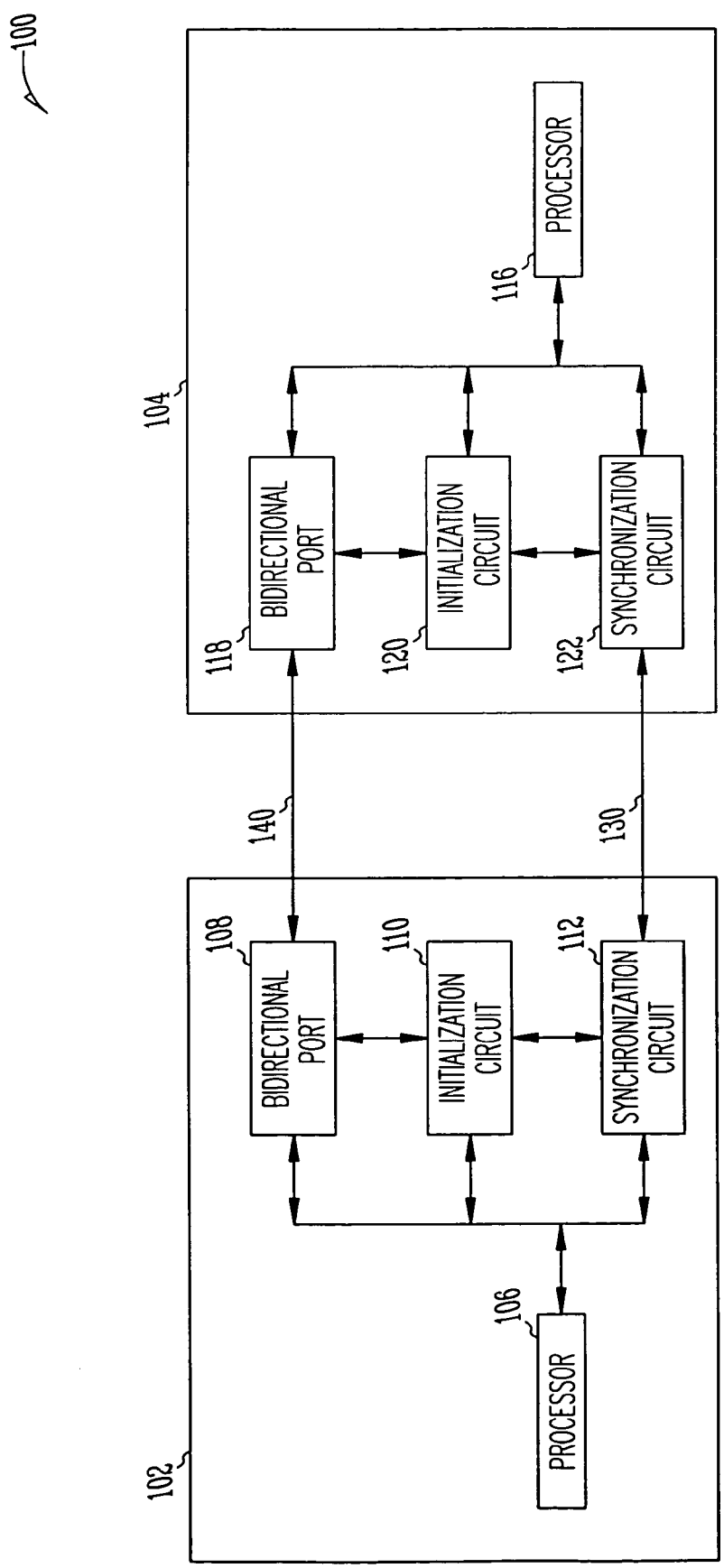
FIG. 1 shows a system employing simultaneous bidirectional ports.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to synchronize multiple simultaneous bidirectional ports on the same bus. A synchronization circuit having imbalanced output impedance is coupled to another synchronization circuit on a bidirectional bus. The imbalanced output impedance is generated by differently sized pullup transistor and pulldown transistors. In one embodiment, a PMOS pullup transistor has an output impedance approximately equal to ten times the output impedance of an NMOS pulldown transistor. A receiver with input hysteresis has an input node coupled to the output of the driver. The hysteresis is satisfied when drivers from both simultaneous bidirectional ports assert output signals, thereby alerting both ports that each is ready to communicate.

FIG. 1 shows a system employing simultaneous bidirectional ports. System 100 includes integrated circuits 102 and 104 interconnected by conductors 130 and 140. Integrated circuit 102 includes processor 106, bidirectional port 108, initialization circuit 110, and synchronization circuit 112. Integrated circuit 104 includes processor 116, bidirectional port 118, initialization circuit 120, and synchronization circuit 122. In the embodiment shown in FIG. 1, integrated circuits 102 and 104 are shown having substantially similar circuits, such as processors 106 and 116. In other embodiments, integrated circuits 102 and 104 do not have substantially similar circuits. For example, integrated circuits 102 and 104 can be processors, processor peripherals, memory devices including dynamic random access memories (DRAM), memory controllers, or any other integrated circuit employing simultaneous bidirectional ports.

Integrated circuits 102 and 104 are agents on a simultaneous bidirectional bus. The simultaneous bidirectional bus can include any number of signal lines, but for simplicity, FIG. 1 shows one signal line, conductor 140. Likewise, agents on the simultaneous bidirectional bus can include any number of bidirectional ports, and bidirectional ports can include any number of drivers and receivers. To simplify the explanation, each of integrated circuits 102 and 104 are shown with a single bidirectional port.

Integrated circuits 102 and 104 communicate with each other using bidirectional ports 108 and 118. Each bidirectional port sends and receives data on conductor 140. Initialization circuits 110 and 120 operate to initialize all or portions of integrated circuits 102 and 104. For example, in some embodiments, initialization circuit 110 initializes a control loop in bidirectional port 108. Examples of control loops that can be initialized include variable output impedance circuits and variable slew rate circuits. Other types of initialization operations can be performed by initialization circuit 110 without departing from the scope of the present invention.

Integrated circuits 102 and 104 also communicate with each other using synchronization circuits 112 and 122. Each synchronization circuit communicates with the other using conductor 130. In operation, synchronization circuits 112 and 122 alert each other that initialization of the respective integrated circuit is complete. When initialization of both integrated circuits is complete, each synchronization circuit can report this to the integrated circuit within which it is situated. For example, when initialization circuit 120 reports to synchronization circuit 122 that initialization is complete, synchronization circuit 122 can assert a signal on conductor 130. When initialization circuit 110 within integrated circuit 102 completes initialization, synchronization circuit 112 can assert another signal on conductor 130. When both synchronization circuits 112 and 122 have asserted signals on conductor 130, initialization of both integrated circuits 102 and 104 is complete. At this time, synchronization circuits 112 and 122 can report to integrated circuits 102 and 104, respectively, that initialization on both ends of the simultaneous bidirectional bus is complete, and the agents on the bus are ready to communicate.

In some embodiments, initialization circuit 110 initializes bidirectional port 108, and alerts synchronization circuit 112 when initialization is complete. For example, a closed loop impedance control circuit can initialize the output impedance of a data driver in bidirectional port 108, and directly notify synchronization circuit 112 when the output impedance of the data driver is set. In other embodiments, initialization circuit 110 communicates with processor 106 to report the completed initialization, and processor 106 communicates with synchronization circuit 112.

In some embodiments, when synchronization circuits 112 and 122 both report that initialization is complete, synchronization circuit 112 within integrated circuit 102 notifies processor 106. This can be performed through an interrupt, by polling, or by any other suitable processor communication mechanism. Processor 106 then communicates with bidirectional port 108 to report that initialization is complete, and that simultaneous bidirectional communications can take place.

The initialization provided by initialization circuits 110 and 120 can be performed at system startup, or after an event that cause a re-initialization. For example, when system power is applied, initialization circuits 110 and 120 provide start-up initialization. Also for example, when a portion of system 100 is reset or is subject to a large noise event, re-initialization may take place. Initialization can also take place during a hot-swap event, when one or more system components are removed or added to the system while power is applied.

In the embodiment shown in FIG. 1, initialization circuit 110 is shown separate from processor 106 and bidirectional port 108. This structure emphasizes the initialization of the bidirectional port. In other embodiments, the initialization function is performed by dedicated circuitry within the bidirectional port, and in other embodiments, the processor performs all or part of the initialization functions.

Figure 2:
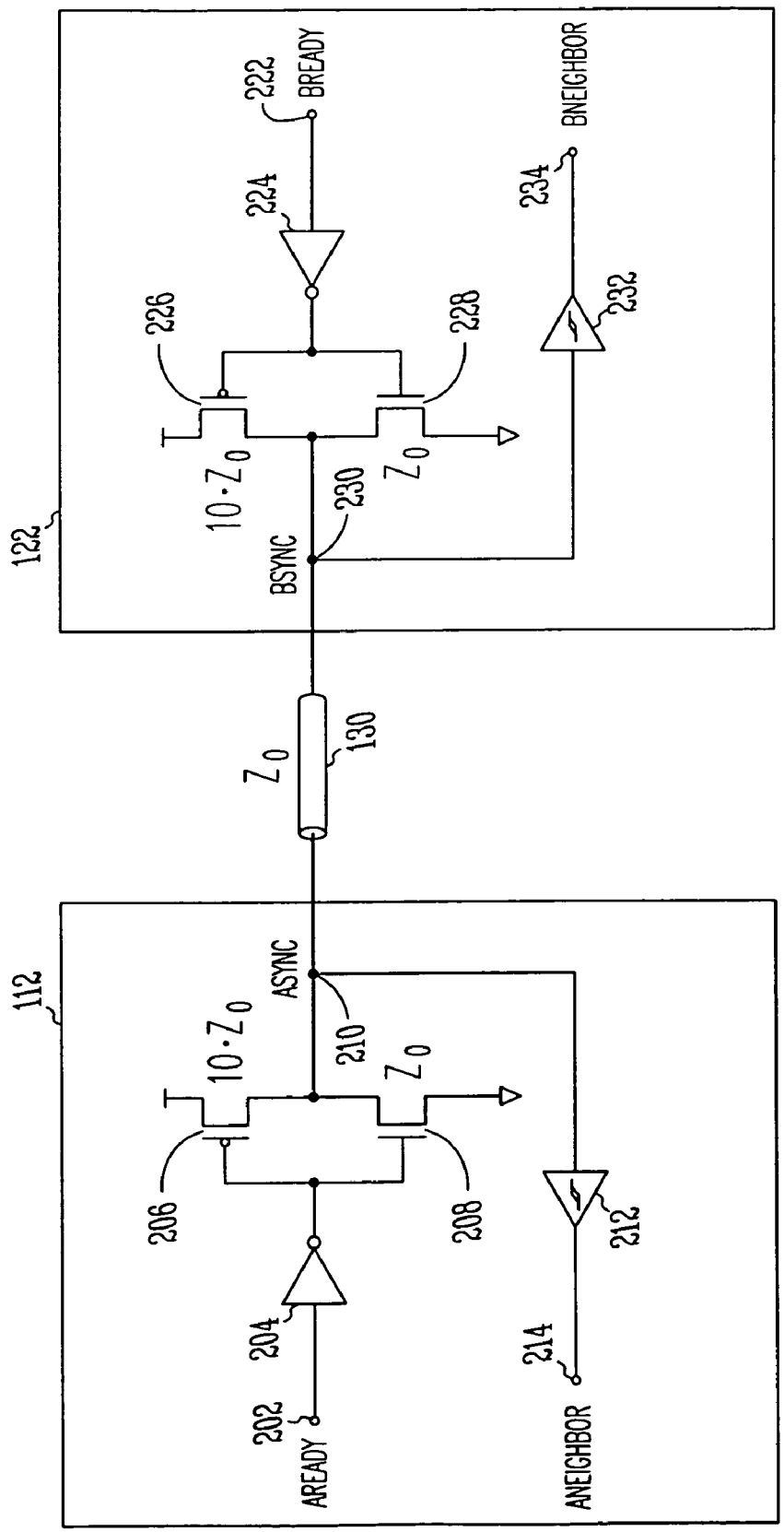
FIG. 2 shows a diagram of two synchronization circuits coupled together.

FIG. 2 shows a diagram of two synchronization circuits coupled together. Synchronization circuit 112 is a synchronization circuit within one agent on a simultaneous bidirectional bus, and synchronization circuit 122 is a synchronization circuit within another agent on the same simultaneous bus. For the purposes of explanation, synchronization circuit 112 is considered to be within the "A" agent on the simultaneous bidirectional bus, and synchronization circuit 122 is considered to be within the "B" agent on the same simultaneous bidirectional bus. Nodes and signals pertaining to the synchronization circuit 112 are prefixed with the letter "A," and nodes and signals pertaining to synchronization circuit 122 are prefixed with the letter "B."

Synchronization circuit 112 includes receiver 212, and a driver that includes inverter 204, P-channel Metal Oxide Semiconductor (PMOS) transistor 206 and N-channel Metal Oxide Semiconductor (NMOS) transistor 208. Synchronization circuit 112 has an internal interface and an external interface. The internal interface includes node 202 and 214. The signal on node 202 is termed the "AREADY" signal, and the signal on node 214 is termed the "ANEIGHBOR" signal. The external interface includes the output of the driver at node 210, labeled "ASYNC." Synchronization circuit 122 includes corresponding interfaces, nodes, and signals, prefixed with the letter "B."

The sizes of PMOS transistor 206 and NMOS transistor 208 are arranged such that the output impedance of PMOS transistor 206 is substantially larger than the output impedance of NMOS transistor 208, and such that the output impedance of NMOS transistor 208 substantially matches the impedance of conductor 130. In some embodiments, the output impedance of PMOS transistor 206 is set to be at least ten times that of NMOS transistor 208 and conductor 130. For example, in the embodiment shown in FIG. 2, both conductor 130 and NMOS transistor 208 have an impedance of $Z_0$, and PMOS transistor 206 has an impedance of $10Z_0$.

In operation, when agent A is ready to communicate, such as when initialization is complete, the AREADY signal on node 202 of the internal interface is asserted high. AREADY can be asserted by a processor, such as processor 106, or by a dedicated circuit, such as initialization circuit 110 (FIG. 1). Prior to the assertion of the AREADY signal, NMOS transistor 208 is on and PMOS transistor 206 is off. As long as the driver within synchronization circuit 122 is in the same state, then the ASYNC signal on node 210 is substantially at the reference potential connected to the source of NMOS transistor 208. When the AREADY signal is asserted, NMOS transistor 208 is turned off and PMOS transistor 206 is turned on. As a result, the ASYNC signal on node 210 increases in voltage. Because the output impedance of PMOS transistor 206 is much greater than the impedance of conductor 130, a voltage divider is formed that keeps the voltage of the ASYNC signal from rising very far. When both synchronization circuits assert signals onto conductor 130, then the voltage of both the ASYNC signal and the BSYNC signal will rise to close to the positive reference connected to the drain of PMOS transistor 206.

Receivers 212 and 232 have inputs with hysteresis, commonly referred to as "Schmitt triggers." The hysteresis of receivers 212 and 232 ensures that the output nodes change state only when the voltage on the input node satisfies the hysteresis. For example, the output of receiver 212 will change state when the voltage on the input node travels through the center point of the logic voltage swing plus a voltage delta. Likewise, the output node will change state in the other direction only when the input hysteresis is satisfied in the other direction. This provides noise immunity on the input to the receivers.

When one of AREADY or BREADY is asserted by the respective agent, the input nodes of receiver 212 and 232 will experience various voltage values as the signal reflects back and forth on conductor 130, but the input voltage value will not be high enough to satisfy the hysteresis of either receiver 212 or 232. Only when both AREADY and BREADY are asserted will the hysteresis in receivers 212 and 232 be satisfied, causing the ANEIGHBOR and BNEIGHBOR signals to be asserted. When the ANEIGHBOR signal is asserted, the agent that includes synchronization circuit 112 has an indication that both of the agents on the simultaneous bidirectional bus are ready to communicate, and when BNEIGHBOR is asserted, the agent that includes synchronization circuit 122 has an indication that both of the agents on the simultaneous bidirectional bus are ready to communicate.

Figure 3:
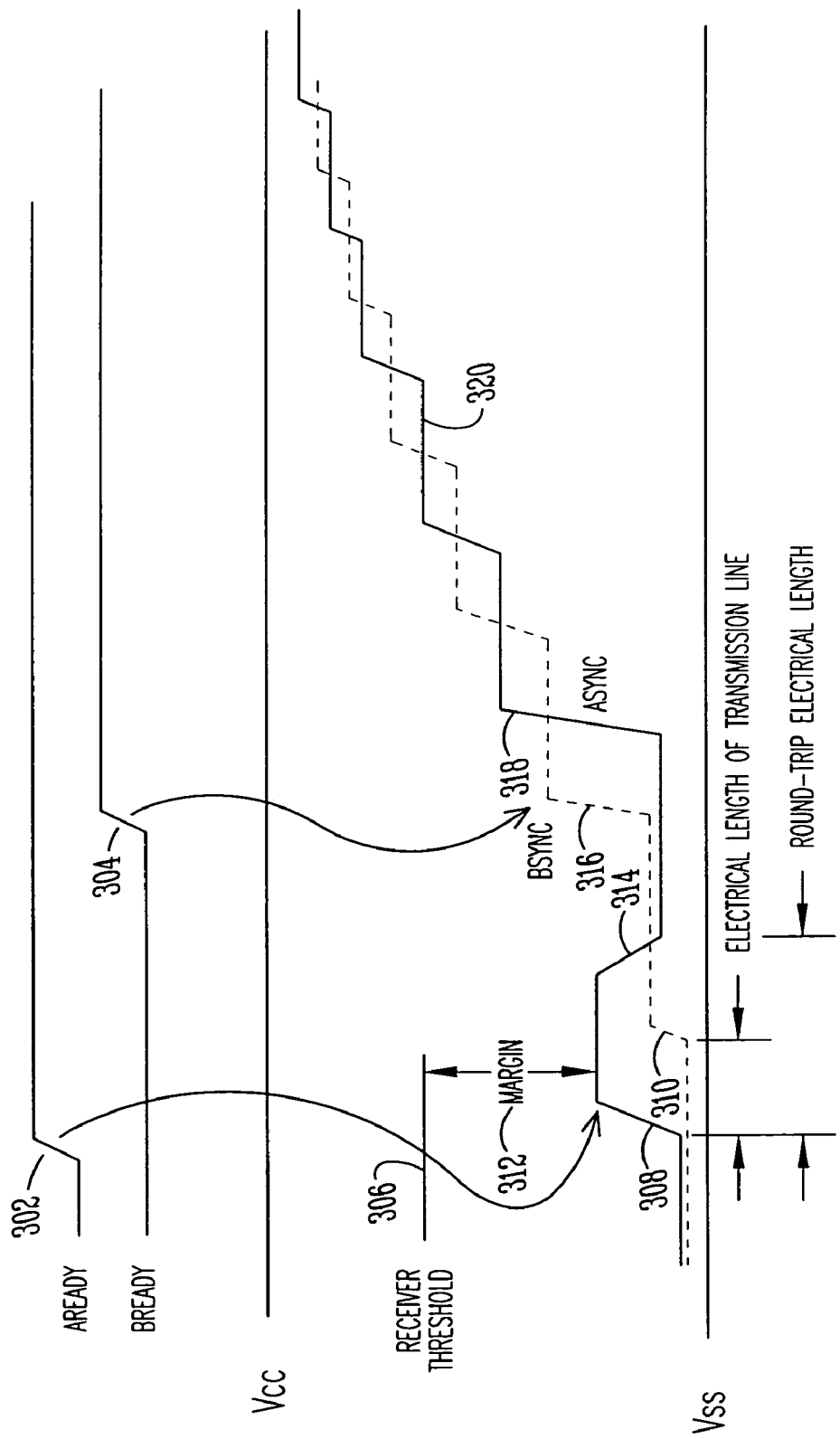
FIG. 3 shows a timing diagram of the operation of the circuit of FIG. 2.

FIG. 3 shows a timing diagram of the operation of the circuit of FIG. 2. The operation just described with respect to AREADY being asserted prior to BREADY being asserted is shown in FIG. 2. AREADY is asserted high at 302. This corresponds to NMOS transistor 208 turning off and PMOS transistor 206 turning on. ASYNC is shown increasing in voltage at 308 as a result of AREADY being asserted at 302. After a time equivalent to the electrical length of the transmission line, BSYNC rises in voltage at 310. BSYNC does not rise as high as ASYNC because the termination at node 230 is substantially equal to the line impedance, $Z_O$. It should be noted that it is not necessary for the pulldown impedance of either driver to equal the line impedance, but that this condition provides a satisfactory termination. After a time equal to one round-trip electrical length of the transmission line, ASYNC reduces in voltage as shown by 314. Prior to the assertion of BREADY, small reflections (not shown) travel back and forth on the transmission line (conductor 130).

Receiver threshold 306 is the voltage level necessary for either ASYNC or BSYNC to satisfy the hysteresis of either receiver 212 or 232. As can be seen in FIG. 3, the initial voltage step launched into the transmission line falls short of threshold 306 by margin 312. Margin 312 is large in part because the pullup to pulldown impedance ratio of the drivers in synchronization circuits 112 and 122 is ten to one. Other impedance ratios can be used while still maintaining adequate margin 312 so that neither ANEIGHBOR nor BNEIGHBOR is falsely asserted.

When BREADY is asserted at 304, BSYNC increases in voltage correspondingly at 316. With both AREADY and BREADY asserted, both ASYNC and BSYNC eventually increase in voltage enough to surpass receiver threshold 306, causing ANEIGHBOR and BNEIGHBOR to assert within synchronization circuits 112 and 122, respectively. Because of the impedance mismatch between line 130 and PMOS transistors 206 and 226, reflections continue to bounce back and forth across line 130 until the voltage settles out close to Vcc. The reflections are shown at 320.

The relative impedance of the pullup and pulldown transistors and the transmission line, and the hysteresis of the Schmitt trigger receivers can be varied to vary margin 312 and the amount of time (or number of reflections) before ASYNC and BSYNC cross receiver threshold 306. For example, in the embodiment shown in FIG. 2, the pullup to pulldown impedance ratio is ten to one and the ratio of the pulldown transistor to transmission line impedance ratio is one to one. In some embodiments, the pullup to pulldown ratio is five to one. This decreases margin 312, but also decreases the amount of time between the assertion of both AREADY and BREADY and when ASYNC and BSYNC cross the receiver threshold.

As can be seen from FIGS. 2 and 3, in some embodiments, the output impedance of the drivers is imbalanced with a pulldown impedance of substantially $Z_O$ and a pullup impedance of substantially $10Z_O$. As a result, the READY signal on both agents must be asserted in order for the SYNC signals to rise high enough to satisfy the hysteresis of the receivers, thereby asserting the NEIGHBOR signals on each agent. Moreover, any glitch that occurs when only one end of the link asserts the READY signal is reduced because the pullup impedance is weak compared to the pulldown impedance and compared to the link impedance of $Z_O$. Also, setting the threshold of the Schmitt trigger receivers higher than the initial voltage step into the line prevents the NEIGHBOR signal from false assertions.

Figure 4:
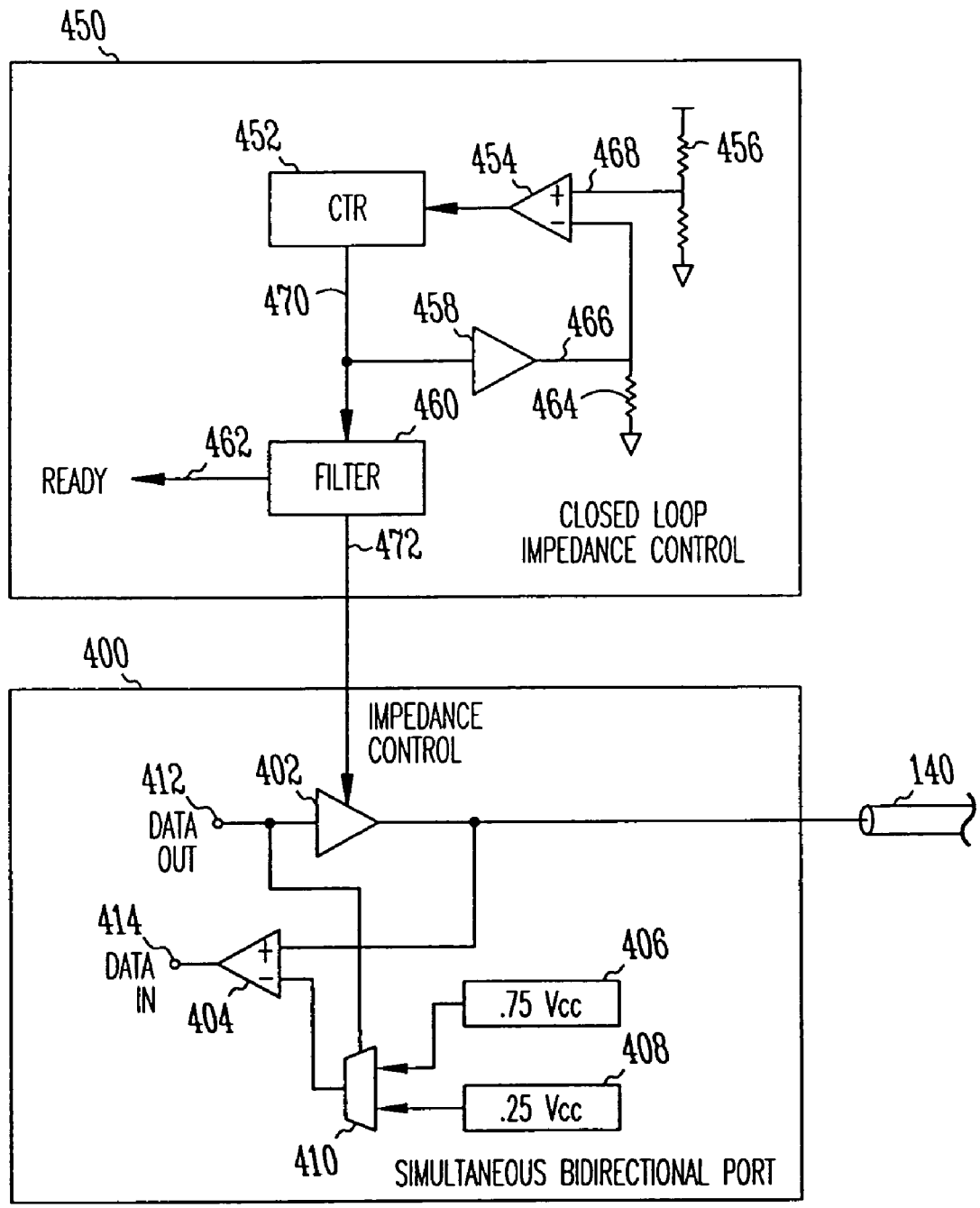
FIG. 4 shows a simultaneous bidirectional port circuit with closed loop impedance control.

FIG. 4 shows a simultaneous bidirectional port circuit with closed loop impedance control. Simultaneous bidirectional port circuit 400 is a bidirectional port circuit such as bidirectional port circuit 108 or 118 (FIG. 1). Closed loop impedance control circuit 450 is an initialization circuit in an integrated circuit, such as initialization circuit 110 or 120. Simultaneous bidirectional port circuit 400 includes driver 402, receiver 404, multiplexer 410 and voltage references 406 and 408. The output node of driver 402 drives conductor 140, and is also the input node for receiver 404. Conductor 140 is simultaneously driven by another driver in another simultaneous bidirectional port circuit, and receiver 404 determines the logic value driven on conductor 140 by the other driver. For example, referring now back to FIG. 1, bidirectional ports 108 and 118 both include drivers and receivers such as driver 402 and receiver 404. The receiver in bidirectional port 108 determines the logic value driven on conductor 140 by the driver in bidirectional port 118, and the receiver in bidirectional port 118 determines the logic value driven on the conductor by the driver in bidirectional port 108.

Referring again to FIG. 4, receiver 404 compares the voltage value on conductor 140 to the voltage value of either reference 406 or reference 408 depending on the state of the outgoing data on node 412. The outgoing data steers multiplexer 410 so that one of reference 406 and reference 408 is present on one of the inputs to receiver 404. Details of one embodiment of a simultaneous bidirectional port can be found in U.S. Pat. No. 5,604,450, issued Feb. 18, 1997.

Figure 5:
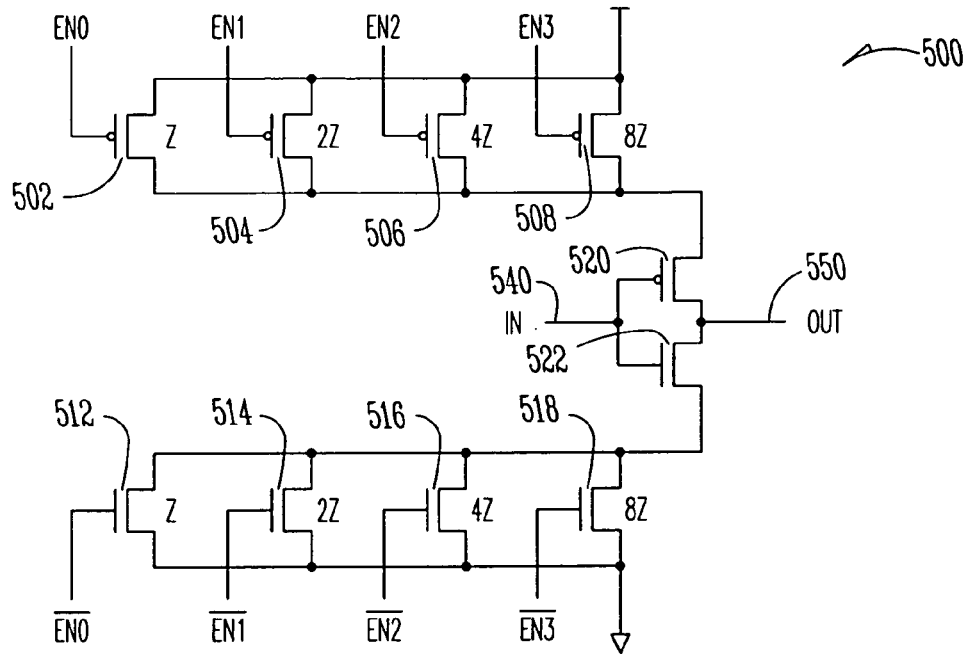
FIG. 5 shows a driver with controllable output impedance.

Driver 402 is a driver having a controllable output impedance, one embodiment of which is shown in FIG. 5. The output impedance of driver 402 is controlled by closed loop impedance control circuit 450. Closed loop impedance control circuit 450 includes sample and compare circuit 454, up/down counter 452, dummy driver 458, and digital filter 460. The control loop is formed by sample and compare circuit 454, up/down counter 452, and dummy driver 458. Dummy driver 458 is terminated with resistor 464. In some embodiments, resistor 464 is a precision resistor external to the integrated circuit that includes closed loop impedance control circuit 450. This allows a system designer to select a value for resistor 464, thereby selecting a reference voltage present on node 466.

The voltage on node 466, which is a function of the output impedance of dummy driver 458, is compared with a target voltage on node 468 by sample and compare circuit 454. In some embodiments, sample and compare circuit 454 is an analog comparator that samples the voltage values on nodes 466 and 468, compares them, and produces a digital signal on the output to signify which of the two input voltage values is larger. The output of sample and compare circuit 454 controls the counting of up/down counter 452. Up/down counter 452 produces an unfiltered impedance control value on node 470, which controls the output impedance of dummy driver 458, and closes the loop. When the impedance of dummy driver 458 needs to be decreased, up/down counter 452 counts in one direction, and when the impedance of dummy driver 458 needs to increase, up/down counter 452 counts in the other direction. The unfiltered impedance control value on node 470 can include a single bit, but can also include a plurality of bits. When a single bit is used, the impedance value toggles between two values, and when N bits are used, the impedance can take on any of $2^N$ different values.

When the control loop of impedance control circuit 450 locks, the unfiltered impedance control signal alternates between two values. This results from the fact that the change in output impedance of dummy driver 458 causes the voltage on node 466 to surpass the voltage on node 468. In one embodiment, for each successive clock cycle thereafter, the unfiltered impedance control signal on node 466 alternates counting up and down as the voltage on node 466 alternates higher and lower than the target voltage on node 468.

Impedance control circuit 450 also includes digital filter 460. Digital filter 460 receives the unfiltered impedance control value on node 470 and produces a filtered impedance control value on node 472. The filtered impedance control value on node 472 controls the output impedance of driver 402 in simultaneous bidirectional port 400. When the loop is locked and the unfiltered impedance control signal alternates between two values, digital filter 460 provides a steady state filtered impedance control signal to driver 402 on node 472. In addition, when the loop is locked, the digital filter outputs a READY signal on node 462, signifying that the closed loop impedance control circuit has initialized. This corresponds to the AREADY signal on node 202 (FIG. 2).

The closed loop impedance control circuit of FIG. 4 is but one example of an initialization circuit that can be used in a system such as system 100 (FIG. 1). In this example, the READY signal is generated directly from digital filter 460 in closed loop impedance control circuit 450. In other embodiments, closed loop impedance control circuit 450 communicates with a processor, such as processor 106 (FIG. 1), and the processor relays the READY information to a synchronization circuit such as synchronization circuit 112 (FIG. 1).

The closed loop impedance circuit of FIG. 4 can initialize the output impedance of driver 402 during system initialization (e.g., at power-up), or can re-initialize the impedance of driver 402 after an event has changed the impedance. Example events include a noise spike in the system, or a hot-swap event. When a noise spike changes the voltage on resistor 464, the loop becomes unlocked, and the READY signal on node 462 is de-asserted while the loop re-locks (or "re-initializes"). A hot-swap event can occur when a system component is removed from a system while the power is on. During a hot-swap event, when a new system component is installed, the initialization takes place, and the READY signal is asserted when the initialization is complete.

FIG. 5 shows a driver with controllable output impedance. Driver 500 is a driver, such as driver 402, capable of driving a bidirectional data line. The enable signals (EN0–EN3) correspond to the impedance control value on node 472 (FIG. 4).

Driver 500 includes input node 540 and output node 550. Input node 540 is coupled to the gate of PMOS transistor 520, and is also coupled to the gate of NMOS transistor 522. Taken together, PMOS transistor 520 and NMOS transistor 522 function as an inverter. Connected in a cascode arrangement with PMOS transistor 520 are parallel PMOS transistors 502, 504, 506, and 508. Likewise, connected in a cascode arrangement with NMOS transistor 522 are parallel NMOS transistors 512, 514, 516, and 518. Any number of parallel PMOS transistors and parallel NMOS transistors can be on at any time, thereby providing a variable output impedance at node 550. The parallel NMOS and PMOS transistors are sized with a binary weighting such that the output impedance can be controlled with a binary number. For example, PMOS transistor 502 and NMOS transistor 512 have an impedance value of "Z," PMOS transistor 504 and NMOS transistor 514 have an impedance value twice as great, and so on. The binary number in the embodiment of FIG. 5 is four bits wide corresponding to the enable signals labeled EN0 through EN3.

The use of a binary weighted impedance control mechanism allows an up/down counter to be employed to modify the impedance one value at a time. As the control signals from the up/down counter count up, more (or larger) transistors are turned on, and the output impedance drops. Likewise, as the counter counts down, the output impedance increases.

In another embodiment, linear weighting is employed. Linear weighting allows a shift register or other similar component to control the output impedance by changing one bit at a time. A driver having linear weighted impedance control allows for precise control of the output impedance with reduced chance of glitches at the expense of increased signal lines and transistor count. For example, in the embodiment of FIG. 5, four enable signals provide 16 different output impedance values. A linear weighted output driver with 16 impedance values includes 16 parallel NMOS transistors and 16 parallel PMOS transistors driven by 16 control signals. Linear weighted drivers can be implemented without departing from the scope of the present invention.

Figure 6:
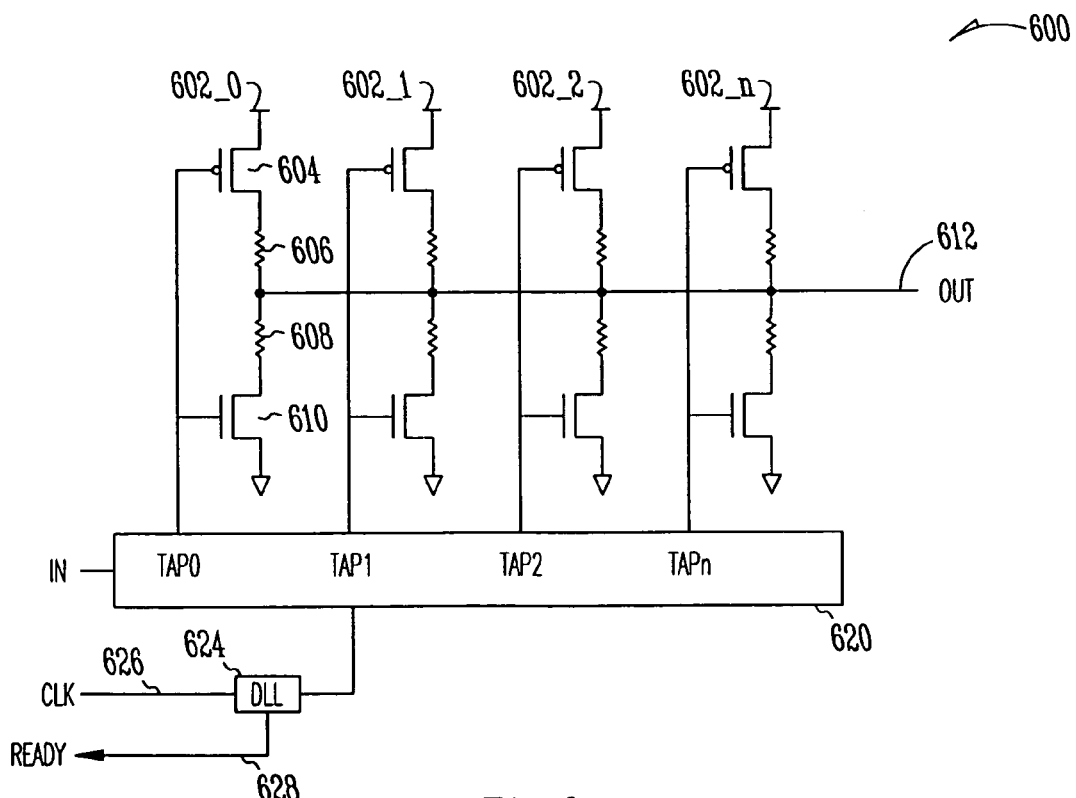
FIG. 6 shows a driver with controllable output slew rate.

FIG. 6 shows a driver with controllable output slew rate. Driver circuit 600 includes a plurality of push-pull driver circuits 602_0 to 602_n. Each push-pull driver circuit includes a pullup transistor 604, a pullup resistor 606, a pulldown resistor 608, and a pulldown transistor 610. The series resistors of each push-pull driver circuit have a resistance which is relatively large in relation to an impedance of the transistors. As such, the series coupled resistors 606 and 608 dominate the series impedance, and the push-pull driver circuit has good linearity from power rail to power rail. The resistors can be fabricated from any suitable structure, such as an N-well layer of a standard CMOS process.

The number of push-pull driver circuits provided in driver circuit 600 is determined by a number of taps provided by a delay line circuit 620. That is, delay line circuit 620 includes a plurality of delay stages which are tapped to provide a number of delayed signals. In the embodiment illustrated in FIG. 6, the delay line circuit has four taps. Each push-pull direr circuit is turned on in sequence, according to the delay between the taps in delay line 620. The output signal on node 612 transitions from ground to VCC in a plurality of discrete steps as the push-pull driver circuits turn on in sequence. The number of steps corresponds to the number (n+1) of push-pull driver circuits provided in the driver circuit. In some embodiments, the output signal on node 612 is filtered to provide a linearly varying signal as the push-pull driver circuits turn on or off.

Delay line 620 can be implemented in several ways. In one embodiment, the delay line can be implemented as a string of inverter circuits. This embodiment provides a resolution between consecutive tap output signals of two inverter delays. Two strings of inverters can be provided to achieve a resolution of one inverter, one driven by input data and the other driven by an inverse of the input data. In either embodiment, jitter may be experienced through the driver circuit that is close to jitter of a standard CMOS output circuit. To reduce this jitter, the delay line circuit can be coupled to receive a delay control signal from a delay locked loop circuit 624. The delay of the delay circuit, therefore, is locked to a clock signal and remains stable with respect to process, voltage, and temperature variations. Further, low-to-high and high-to-low signal transitions in the tap output signals are equal.

In embodiments that include delay locked loop 624, a period of time lapses as the delay of the delay circuit is locked to the clock signal on node 626. When the delay locked loop is locked, delay locked loop 624 can produce a READY signal on node 628 to alert a synchronization circuit such as synchronization circuit 112 (FIG. 2) that initialization is complete.

Driver circuit 600 is but one embodiment of a driver having output slew rate control. Other driver circuits can also be used. In addition, driver circuit 600 can be combined with driver circuit 500 (FIG. 5) to create a single driver with variable output impedance and variable output slew rate.

Figure 7:
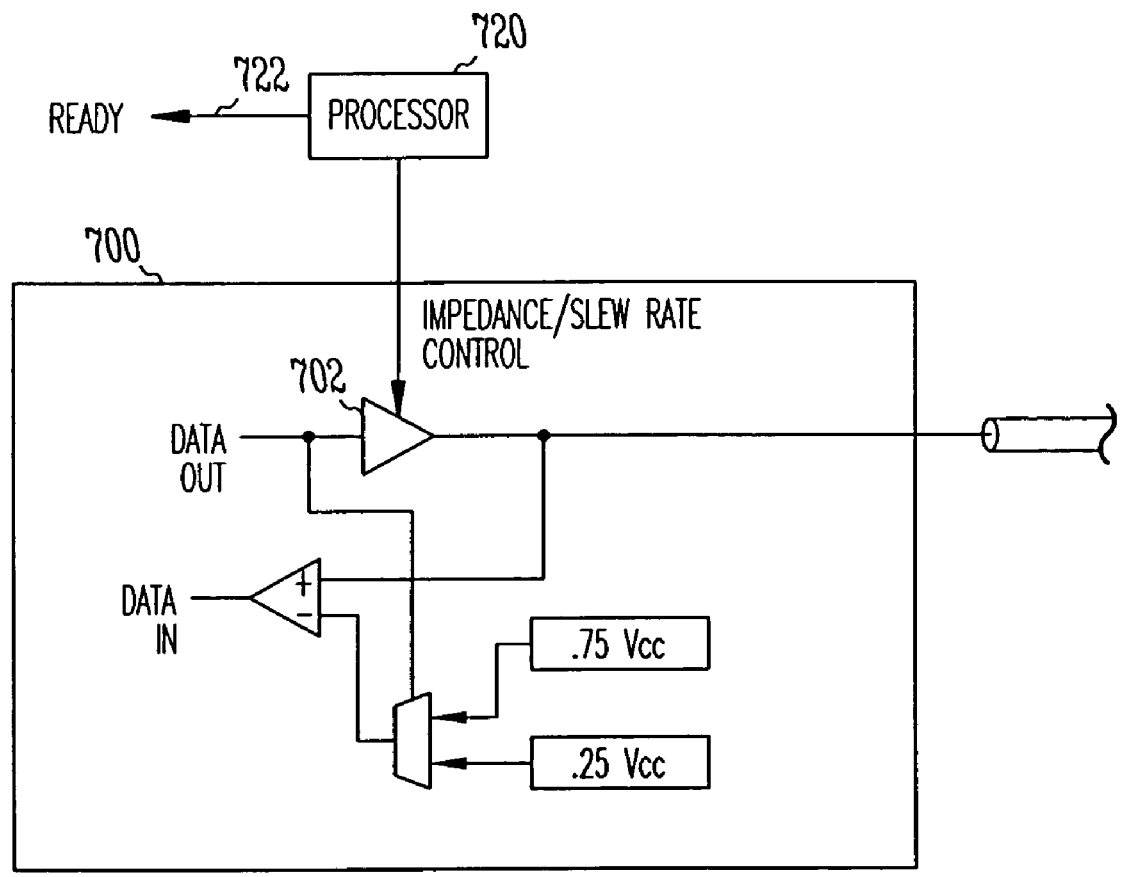
FIG. 7 shows a simultaneous bidirectional port circuit with impedance and slew rate control.

FIG. 7 shows a simultaneous bidirectional port circuit with impedance and slew rate control. Simultaneous bidirectional port circuit 700 is shown coupled to processor 720. In the embodiment illustrated in FIG. 7, processor 720 controls the output impedance and slew rate of driver 702. When the output impedance and slew rate of driver 702 is initialized, processor 720 can assert the READY signal on node 722, thereby alerting a synchronization circuit that initialization is complete.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An integrated circuit comprising:
   a driver in a simultaneous bidirectional port having an output node to be coupled to a conductor external to the integrated circuit, such that the driver launches an initial voltage value on the conductor when the driver changes state; and
   a receiver in the simultaneous bidirectional port having input hysteresis, the receiver including an input node coupled to the output node of the driver, the input hysteresis having a threshold set such that the initial voltage value does not change an output state of the receiver.

2. The integrated circuit of claim 1 wherein the driver comprises a pullup transistor having an output impedance, and a pulldown transistor having an output impedance, the output impedance of the pullup transistor being greater than the output impedance of the pulldown transistor.

3. The integrated circuit of claim 1 wherein:
   the simultaneous bidirectional port includes a data driver and data receiver, the data driver including a closed loop impedance control circuit.

4. The integrated circuit of claim 1 wherein the driver includes an input node, and the receiver includes an output node, the integrated circuit further comprising:
   a processor coupled to the input node of the driver and to the output node of the receiver, the processor being configured to assert a ready signal on the input node of the driver and to monitor a signal on the output node of the receiver for an indication that the driver and at least one other driver coupled to the input node of the receiver have driven high.

5. The integrated circuit of claim 1 wherein the integrated circuit is a circuit type from the group comprising: a processor, a processor peripheral, a memory, and a memory controller.

6. The integrated circuit of claim 1 further including an initialization circuit to drive an input node of the driver low during initialization.

7. The integrated circuit of claim 2 wherein the output impedance of the pullup transistor is at least five times greater than the output impedance of the pulldown transistor.

8. The integrated circuit of claim 3 wherein the integrated circuit is a circuit type from the group comprising: a processor, a processor peripheral, a memory, and a memory controller.

9. An integrated circuit comprising:
   a driver having a pullup transistor and a pulldown transistor with an output node formed at a junction therebetween, the pullup transistor having an output impedance greater than the pulldown transistor; and
   a receiver having an input node coupled to the output node of the driver, the receiver having input hysteresis sufficient to detect when the driver and at least one additional driver coupled to the input node drive high.

10. The integrated circuit of claim 9 further comprising:
   a simultaneous bidirectional port including at least one initialization circuit; and
   a control circuit to turn on the pullup transistor and to turn off the pulldown transistor when the at least one initialization circuit has performed an initialization.

11. The integrated circuit of claim 10 wherein the at least one initialization circuit comprises a closed loop output impedance control circuit.

12. The integrated circuit of claim 10 wherein the at least one initialization circuit includes an output slew rate control circuit.

13. The integrated circuit of claim 10 wherein the integrated circuit is a circuit type from the group comprising: a processor, a processor peripheral, a memory, and a memory controller.

14. A simultaneous bidirectional port circuit comprising:
   a data driver having an output impedance control circuit to modify an output impedance of the data driver wherein the output impedance control circuit is configured to initialize the output impedance of the data driver; and
   a synchronization circuit to alert a second simultaneous bidirectional port circuit that the output impedance has been modified wherein the synchronization circuit is configured to alert the second simultaneous bidirectional port circuit that the output impedance has been initialized, the synchronization circuit comprising:
   a driver having an output node to be coupled through a conductor to an output node of the second simultaneous bidirectional port circuit; and
   a receiver having an input node coupled to the output node; and
   wherein the receiver includes hysteresis sufficient to allow the receiver to change state only after both the output node of the driver and the output node of the second simultaneous bidirectional port circuit are asserted.

15. The simultaneous bidirectional port circuit of claim 14 further including a slew rate control circuit to control the output slew rate of the data driver.

16. The simultaneous bidirectional port circuit of claim 15 wherein the synchronization circuit is configured to assert after the slew rate control circuit is initialized.

17. A simultaneous bidirectional port circuit comprising:
   a data driver having an output impedance control circuit to modify an output impedance of the data driver; and
   a synchronization circuit to alert a second simultaneous bidirectional port circuit that the output impedance has been modified, the synchronization circuit comprising:
      a driver having an output node to be coupled to a conductor common to both the simultaneous bidirectional port circuit and the second simultaneous bidirectional port circuit, the driver having a pullup transistor and a pulldown transistor, the pullup transistor having a higher output impedance than the pulldown transistor; and
      a receiver having an input node coupled to the output node of the driver.

18. An integrated circuit comprising:
   a simultaneous bidirectional port to be coupled to a second simultaneous bidirectional port on a second integrated circuit;
   at least one initialization circuit to perform an initialization of the simultaneous bidirectional port; and
   a synchronization circuit to be coupled to a second synchronization circuit on the second integrated circuit, to indicate when the initialization of the simultaneous bidirectional port and an initialization of the second simultaneous bidirectional port is complete.

19. The integrated circuit of claim 18 wherein the at least one initialization circuit comprises an output impedance control circuit.

20. The integrated circuit of claim 18 wherein the at least one initialization circuit comprises an output slew rate control circuit.

21. The integrated circuit of claim 18 wherein the synchronization circuit comprises:
   a driver having an output node to be coupled to an output node of the second synchronization circuit on the second integrated circuit; and
   a receiver coupled to the output node of the driver to detect when the output node of the driver and the output node of the second synchronization circuit have signals asserted thereon.

22. An electronic system comprising:
   a first integrated circuit having a first simultaneous bidirectional port comprising a first data driver, a first data receiver, a first synchronization driver, and a first synchronization receiver; and
   a second integrated circuit having a second simultaneous bidirectional port comprising a second data driver, a second data receiver, a second synchronization driver, and a second synchronization receiver;
   wherein output nodes of the first and second data drivers are coupled in common with input nodes of the first and second data receivers, and output nodes of the first and second synchronization drivers are coupled in common with input nodes of the first and second synchronization receivers.

23. The electronic system of claim 22 wherein the first and second simultaneous bidirectional ports include data driver output impedance control circuits, and each of the first and second synchronization drivers are configured to be responsive to a respective one of the data driver output impedance control circuits.

24. The electronic system of claim 22 wherein the first and second synchronization receivers include input hysteresis such that both of the first and second synchronization receivers change state only after both of the first and second synchronization drivers are asserted.

25. The electronic system of claim 22 wherein the first integrated circuit is a circuit type from the group comprising: a processor, a processor peripheral, a memory, and a memory controller.

26. A method of synchronizing an agent to a simultaneous bidirectional bus comprising:
   de-asserting a ready signal to drive a transmission line having a second agent driver present thereon to signify the agent is not ready to communicate on the simultaneous bidirectional bus;
   asserting the ready signal to signify the agent is ready to communicate on the simultaneous bidirectional bus including:
      turning off a pulldown transistor having a first output impedance; and
      turning on a pullup transistor having a second output impedance, wherein the second output impedance is greater than the first output impedance; and
   monitoring the transmission line for an indication that both the agent and the second agent are ready to communicate on the simultaneous bidirectional bus.

27. A method of synchronizing an agent to a simultaneous bidirectional bus comprising:
   de-asserting a ready signal to drive a transmission line having a second agent driver present thereon to signify the agent is not ready to communicate on the simultaneous bidirectional bus;
   asserting the ready signal to signify the agent is ready to communicate on the simultaneous bidirectional bus; and
   monitoring the transmission line for an indication that both the agent and the second agent are ready to communicate on the simultaneous bidirectional bus including monitoring an output node of a receiver having input hysteresis.

28. A processor comprising:
   a driver in a simultaneous bidirectional port having an output node to be coupled to a conductor external to the integrated circuit, such that the driver launches an initial voltage value on the conductor when the driver changes state; and
   a receiver in the simultaneous bidirectional port having input hysteresis, the receiver including an input node coupled to the output node of the driver, the input hysteresis having a threshold set such that the initial voltage value does not change an output state of the receiver.

* * * * *